(12) United States Patent
Lecue et al.

(10) Patent No.: US 10,699,708 B2
(45) Date of Patent: Jun. 30, 2020

(54) ROBOTIC AGENT CONVERSATION ESCALATION

(71) Applicant: Accenture Global Solutions Limited, Dublin (IE)

(72) Inventors: Freddy Lecue, Dublin (IE); Christophe Dominique Marie Gueret, Dublin (IE)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 15/961,393

(22) Filed: Apr. 24, 2018

(65) Prior Publication Data

US 2019/0325868 A1 Oct. 24, 2019

(51) Int. Cl.
| | |
|---|---|
| G10L 15/22 | (2006.01) |
| G10L 25/63 | (2013.01) |
| G10L 15/18 | (2013.01) |
| G06F 16/901 | (2019.01) |

(52) U.S. Cl.
CPC .......... G10L 15/22 (2013.01); G06F 16/9024 (2019.01); G10L 15/1815 (2013.01); G10L 25/63 (2013.01); *G10L 2015/223* (2013.01)

(58) Field of Classification Search
CPC .. G10L 15/22; G10L 15/1815; G06F 16/9024
USPC .................................................. 704/232, 235
See application file for complete search history.

(56) References Cited

U.S. PATENT DOCUMENTS 8,275,117 B2 9/2012 Huet et al.
9,559,993 B2 1/2017 Palakovich et al.
2014/0111689 A1* 4/2014 Kim ........................ H04N 21/84
348/563

(Continued)

OTHER PUBLICATIONS astutesolutions.com [online]. "When Bots Reach Their Limit: The 4 Rules of Intelligent Escalation," Aug. 10, 2016, [Retrieved on Jan. 9, 2018] Retrieved from the Internet: URL<https://www.astutesolutions.com/blog/articles/when-bots-reach-their-limit-the-4-rules-of-intelligent-escalation>. 4 pages.

medium.com [online]. "5 Things You Must Have in Your Chatbot," May 4, 2017, Retrieved on Jan. 9, 2018, Retrieved from the Internet: URL<https://medium.com/hijiffy/5-things-you-must-have-in-your-chatbot-8ce960bba768>. 9 pages.

(Continued)

*Primary Examiner* — Richemond Dorvil
*Assistant Examiner* — Rodrigo A Chavez
(74) *Attorney, Agent, or Firm* — Fish & Richardson P.C.

(57) ABSTRACT

Methods, systems, and apparatus, including computer programs encoded on a computer storage medium, for a conversation monitoring system. In one aspect, a method includes receiving a conversation stream generated from a conversation between a user of a platform and a current robotic agent, where the current robotic agent is one of a plurality of robotic agents servicing the platform; processing the conversation stream to identify characteristics of the conversation; extracting a conversation knowledge graph that includes a plurality of first nodes that each correspond a concept discussed in the conversation; identifying a state change in the conversation from the identified characteristics of the conversation; merging the conversation knowledge graph with a domain knowledge graph into a merged knowledge graph; and replacing the current robotic agent with a replacement robotic agent from the robotic agents, the replacement robotic agent selected based on the percentage matching value of the merged knowledge graph.

20 Claims, 9 Drawing Sheets

(56) References Cited

U.S. PATENT DOCUMENTS

| | | | |
|---|---|---|---|
| 2015/0134325 A1* | 5/2015 | Skiba | G06F 40/30 |
| | | | 704/9 |
| 2016/0099892 A1 | 4/2016 | Palakovich et al. | |
| 2016/0117593 A1* | 4/2016 | London | G06Q 10/10 |
| | | | 706/11 |
| 2016/0379637 A1 | 12/2016 | Crook et al. | |
| 2017/0118336 A1* | 4/2017 | Tapuhi | H04M 3/4938 |
| 2017/0192778 A1* | 7/2017 | Srivastava | G06F 8/20 |
| 2017/0244834 A1* | 8/2017 | Flores | H04M 3/4936 |
| 2017/0323212 A1* | 11/2017 | Volkov | G06N 20/00 |
| 2017/0324866 A1 | 11/2017 | Segre et al. | |
| 2018/0052885 A1 | 2/2018 | Gaskill et al. | |
| 2018/0189267 A1* | 7/2018 | Takiel | G06F 40/35 |

OTHER PUBLICATIONS egain.com [online]. "Virtual Assistant, Chatbot Software, Virtual Agent, Chat Bot, Digital Virtual Assistant | eGain," Retrieved on Jan. 9, 2018, Retrieved from the Internet: URL<http://www.egain.com/products/virtual-assistant-software/>. 2 pages.

AU Office Action in Australian Application No. 2019202382, dated Sep. 27, 2019, 7 pages.

He et al., "Learning Symmetric Collaborative Dialogue Agents with Dynamic Knowledge Graph Embeddings", arXiv, Apr. 24, 2017, 18 pages.

Heck et al., "Deep Learning of Knowledge Graph Embeddings for Semantic Parsing of Twitter Dialogs", GlobalSIP 2014: Machine Learning Applications in Speech Processing, Dec. 2014, 5 pages.

* cited by examiner

ROBOTIC AGENT CONVERSATION ESCALATION

TECHNICAL FIELD

This application generally relates to conversation between users and robotic agents.

BACKGROUND

Providing quality customer service is increasingly important in today's competitive business environment. Although self-service channels, such as a website or mobile application, provide consistent service to customers, service provided through interaction with human or robot (e.g., a chatbot) agents is subjective and therefore suitable for providing quick, real-time responses that can adapt to specific customer needs. A customer's overall satisfaction with a customer service agent (either human or robot) often depends on factors such as the agent's interpersonal skills, personality, and relevant knowledge. Accordingly, it is critical for enterprises to ensure the correct and most adept agent is engaged with a customer during each service interaction.

SUMMARY

Implementations of the present disclosure are generally directed to a conversation monitoring system. More specifically, implementations are directed to a conversation monitoring system that leverages extracted conversation artifacts, such as a knowledge graph, that represent various aspects of conversations between platform users and robotic agents and the relationship between these aspects, to identify abnormal conversation patterns and identify a potential replacement agent, such as a chatbot or a human agent.

In a general implementation, a system includes one or more processors and a computer-readable storage device coupled to the one or more processors. Instructions are stored on the computer-readable storage device that when executed by the one or more processors, cause the one or more processors to perform operations. These operations include receiving a conversation stream that has been generated from a conversation between a user of a platform and a current robotic agent. The current robotic agent is one of a plurality of robotic agents servicing the platform. Each of the robotic agents includes a plurality of features. The conversation stream is processed to identify characteristics of the conversation. A conversation knowledge graph is created based on the characteristics of the conversation. The conversation knowledge graph includes a plurality of first nodes that each correspond a concept discussed in the conversation. A state change is identified in the conversation from the identified characteristics of the conversation. A portion of the conversation knowledge graph is selected and merged with a domain knowledge graph into a merged knowledge graph based on the identification of the state change in the conversation. The domain knowledge graph includes a plurality of second nodes that each correspond to at least one of the features for each of the robotic agents. The merged knowledge graph includes a percentage matching value between a portion of the first nodes and a portion of the second nodes. The current robotic agent is replaced with a replacement robotic agent from the robotic agents that is selected based on the percentage matching value of the merged knowledge graph.

In another general implementation, a computer-implemented method executed by one or more processors includes receiving a conversation stream that has been generated from a conversation between a user of a platform and a current robotic agent. The current robotic agent is one of a plurality of robotic agents servicing the platform. Each of the robotic agents includes a plurality of features. The conversation stream is processed to identify characteristics of the conversation. A conversation knowledge graph is created based on the characteristics of the conversation. The conversation knowledge graph includes a plurality of first nodes that each correspond a concept discussed in the conversation. A state change is identified in the conversation from the identified characteristics of the conversation. A portion of the conversation knowledge graph is selected and merged with a domain knowledge graph into a merged knowledge graph based on the identification of the state change in the conversation. The domain knowledge graph includes a plurality of second nodes that each correspond to at least one of the features for each of the robotic agents. The merged knowledge graph includes a percentage matching value between a portion of the first nodes and a portion of the second nodes. The current robotic agent is replaced with a replacement robotic agent from the robotic agents that is selected based on the percentage matching value of the merged knowledge graph.

In yet another general implementation, one or more non-transitory computer-readable storage media are coupled to one or more processors. Instructions are stored on the one or more non-transitory computer-readable storage media that when executed by the one or more processors, cause the one or more processors to perform operations. These operations include receiving a conversation stream that has been generated from a conversation between a user of a platform and a current robotic agent. The current robotic agent is one of a plurality of robotic agents servicing the platform. Each of the robotic agents includes a plurality of features. The conversation stream is processed to identify characteristics of the conversation. A conversation knowledge graph is created based on the characteristics of the conversation. The conversation knowledge graph includes a plurality of first nodes that each correspond a concept discussed in the conversation. A state change is identified in the conversation from the identified characteristics of the conversation. A portion of the conversation knowledge graph is selected and merged with a domain knowledge graph into a merged knowledge graph based on the identification of the state change in the conversation. The domain knowledge graph includes a plurality of second nodes that each correspond to at least one of the features for each of the robotic agents. The merged knowledge graph includes a percentage matching value between a portion of the first nodes and a portion of the second nodes. The current robotic agent is replaced with a replacement robotic agent from the robotic agents that is selected based on the percentage matching value of the merged knowledge graph.

In an aspect combinable with any of the general implementations, the operations further include generating a confidence factor based on the percentage matching values, the confidence factor representing how closely the replacement robotic agent matches concepts discussed in the conversation.

In another aspect combinable with any of the previous aspects, the operations further include before merging the conversation knowledge graph with the domain knowledge graph, removing irrelevant first nodes from the conversation knowledge graph.

Another aspect combinable with any of the previous aspects, the characteristics of the conversation comprise a semantic sentiment of the conversation, a topic of the conversation, a tone of the conversation, a temporal dimension of the conversation, or a combination thereof.

In another aspect combinable with any of the previous aspects, the irrelevant first nodes are determined based on a temporal distance from the identified state change in the conversation.

In another aspect combinable with any of the previous aspects, the irrelevant first nodes are determined based on a relevance to the identified state change in the conversation.

Another aspect combinable with any of the previous aspects, the conversation knowledge graph includes a plurality of edges each connecting two of the first nodes, each of the edges represent a relationship between the respective connected first nodes.

In another aspect combinable with any of the previous aspects, the identified state change in the conversation comprises a change in a tone of the conversation with the user.

In another aspect combinable with any of the previous aspects, the identified state change in the conversation comprises a change in a topic of conversation.

Another aspect combinable with any of the previous aspects, the conversation stream is generated from speech converted to text through natural language processing (NLP).

In another aspect combinable with any of the previous aspects, the robotic agents comprise chatbots.

In another aspect combinable with any of the previous aspects, the current robotic agent is replaced with a human agent instead of the replacement robotic agent, the human agent is selected based on the percentage matching value of the merged knowledge graph, and the domain knowledge graph includes a portion of the second nodes that each correspond to features describing each of the human agents.

It is appreciated that methods in accordance with the present disclosure can include any combination of the aspects and features described herein. That is, methods in accordance with the present disclosure are not limited to the combinations of aspects and features specifically described herein, but also may include any combination of the aspects and features provided.

The details of one or more implementations of the present disclosure are set forth in the accompanying drawings and the description below. Other features and advantages of the present disclosure will be apparent from the description and drawings, and from the claims.

DETAILED DESCRIPTION

Figure 1:
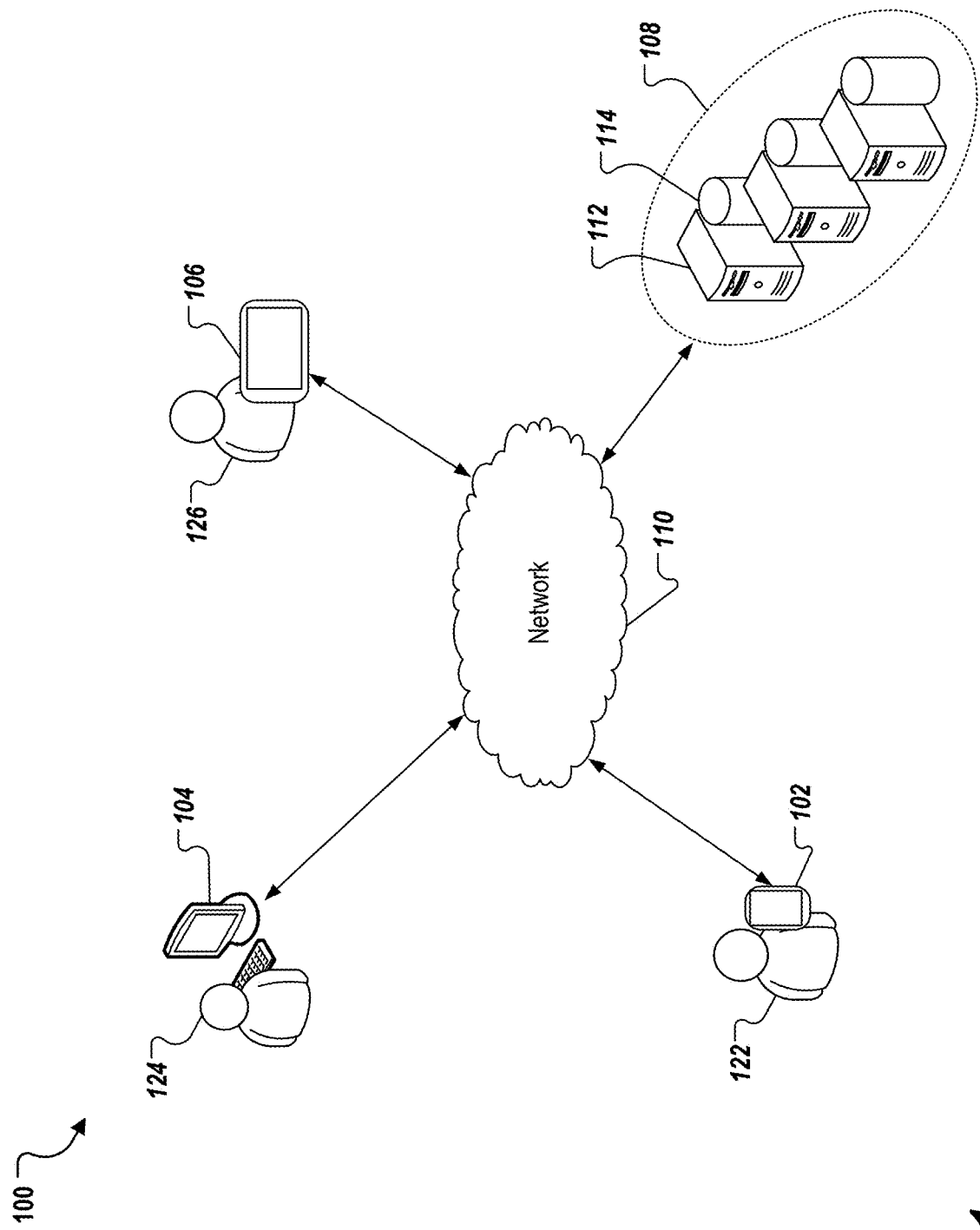
FIG. 1 depicts an example environment that can be employed to execute implementations of the present disclosure.

Implementations of the present disclosure are generally directed to guiding conversations between users (e.g., customers) and customer service agents by ensuring that appropriate agents are engaged with each conversation. More particularly, implementations of the present disclosure are directed to monitoring conversations between users and a robotic agent, such as a chatbot, to follow the overall state of the conversation. When a change in the conversation state is detected, the system assesses the conversation data to determine whether to intervene and redirect the user to a different robotic or human agent.

To provide context for implementations of the present disclosure, the described robotic agents include autonomous agents with built in intelligence that may operate on behalf of an entity but without any interference of that entity. In some implementations, robotic agents are software entities, such as chatbots, that carry out a set of operations on behalf of an entity or another program. These robotic agents operate with some degree of independence or autonomy, and in so doing, employ some knowledge or representation of the goals or desires of their respective entity. A chatbot, which may also be referred to as a talkbot, chatterbot, Bot, instant messaging (IM) bot, interactive agent, or Artificial Conversational Entity, are computer programs that may be used to communicate information to users by mimicking conversations through audio and/or text. Chatbots are typically employed in dialog systems for various purposes including customer service or information acquisition. Chatbots can assist users of such systems by, for example, answering questions or providing help with navigation. Chatbots may also perform simple operations, such as accessing user information, as well as leveraging platform applications, such a website, database, or email service. Chatbot programming varies based on a variety of factors. Such factors may include, for example, the type of platform serviced, the operational logic used to build the chatbot, and the method(s) of communication supported. Common implementations of chatbots include rule-based logic, machine learning, and/or artificial intelligence. For example, some chatbots use sophisticated NLP systems. Simpler implementations of chatbots scan for keywords within the input and select a reply with, for example, the most matching keywords or the most similar wording pattern from a data store.

In view of the foregoing, and as described in further detail herein, implementations of the present disclosure provide a conversation monitoring system that leverages, for example, NLP to construct an artifact, such as a knowledge graph, that represents various aspects of conversations between platform users and robotic agents and the relationship between these aspects. Such aspects may include the topics and intent(s) of the conversation as well as the tone with which the user is communicating. To enrich the artifact, some implementations include processing a conversation stream to determine metadata, such as the user's tone, the user's intent, timestamp data, the engaged entities (e.g., the user and the specific chatbot), and so forth. Implementations include the described system monitoring the conversation for a state change(s), such as a change in the topic, a change in the user's intent, a change in the user's tone, and so forth. When a state change is detected in the conversation, the conversation monitoring system may filter the conversation artifact to remove, for example, old and/or irrelevant data and compare the filtered conversation data to domain related data for robotic and/or human agents supported by the system to determine whether to intervene in the conversation by, for example, redirecting the user to a different chatbot or a human agent. For example, when a conversation moves to a particular topic, a chatbot that has access to or has been trained with more sophisticated or in-depth knowledge with respect to the particular topic may be recommended to replace the current chatbot in a conversation. In another example, a chatbot may be selected based on its programmed "personality" better matching the current tone of the user. In still another example, the current chatbot in a conversation may be determined to be the best chatbot for the particular change in topic and/or tone of the user, and accordingly, no change is made or recommended.

FIG. 1 depicts an example environment 100 that can be employed to execute implementations of the present disclosure. The example system 100 includes computing devices 102, 104, 106, a back-end system 108, and a network 110. In some implementations, the network 110 includes a local area network (LAN), wide area network (WAN), the Internet, or a combination thereof, and connects web sites, devices (e.g., the computing devices 102, 104, 106) and back-end systems (e.g., the back-end system 108). In some implementations, the network 110 can be accessed over a wired and/or a wireless communications link. For example, mobile computing devices (e.g., the smartphone device 102 and the tablet device 106), can use a cellular network to access the network 110.

In the depicted example, the back-end system 108 includes at least one server system 112 and a data store 114. In some implementations, the at least one server system 112 hosts one or more computer-implemented services, such as a chatbot, that users 122-126 can interact with using the respective computing devices 102-106. For example, the computing devices 102-106 are used by respective users 122-126 to engage in conversation with robotic agents hosted by the back-end system 108 over the network 110. In some implementations, back-end system 108 includes computer systems using clustered computers and components to act as a single pool of seamless resources when accessed through the network 110. For example, such implementations may be used in data center, cloud computing, storage area network (SAN), and network attached storage (NAS) applications. In some implementations, back-end system 108 is deployed using a virtual machine(s).

The computing devices 102, 104, 106 may each include any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In the depicted example, the computing device 102 is provided as a smartphone, the computing device 104 is provided as a desktop computing device, and the computing device 106 is provided as a tablet-computing device. It is contemplated, however, that implementations of the present disclosure can be realized with any of the appropriate computing devices, such as those mentioned previously.

In some implementations, the back-end system 108 hosts a conversation monitoring system for monitoring conversation between users and robotic agents, which may also be hosted by the back-end system 108 or by another separate back-end system (not shown) coupled to the back-end system 108 through network 110. More particularly, the back-end system 108 can process the conversation streams for various conversation and make recommendations and/or switch the active chatbot for each conversation.

Implementations of the present disclosure are described in further detail herein with reference to an example context. The example context includes conversation between users of a platform and a chatbot providing support to the platform. It is contemplated, however, that implementations of the present disclosure can be realized in any appropriate context. Other example contexts include the monitoring of any form of conversation between users and human or robotic agents.

In accordance with implementations of the present disclosure, the information extracted from a conversation stream, such as topics, intent, tone, and other metadata, is extracted into a knowledge graph, or a portion of a knowledge graph. A knowledge graph is a collection of data that is related based on a schema representing entities and relationships between entities. The data can be logically described as a graph (even though it may also be provided in table form), in which each distinct entity is represented by a respective node, and each relationship between a pair of entities is represented by an edge between the nodes. Each edge is associated with a relationship and the existence of the edge represents that the associated relationship exists between the nodes connected by the edge. For example, if a node A represents a person Alpha, a node B represents a person Beta, and an edge E is associated with the relationship "is the father of," then having the edge E connect the nodes in the direction from node A to node B in the graph represents the fact that Alpha is the father of Beta. In some examples, the knowledge graph can be enlarged with schema-related knowledge (e.g., Alpha is an instance of the concept Person, Beta is an instance of the concept Person, and "is the father of" is a property or relationship between two entities/instances of concept Person). Adding schema-related information supports the materialization and evaluation of reasoning results.

A knowledge graph can be represented by any of a variety of physical data structures. For example, a knowledge graph can be represented by triples that each represent two entities in order, and a relationship from the first to the second entity; for example, [Alpha, Beta, is the father of], or [Alpha, is the father of, Beta], are alternative ways of representing the same fact. Each entity and each relationship can be, and generally will be, included in multiple triples.

In some examples, each entity can be stored as a node once, as a record or an object, for example, and linked through a linked list data structure to all the relationships the entity has, and all the other entities to which the entity is related. More specifically, a knowledge graph can be stored as an adjacency list in which the adjacency information includes relationship information. In some examples, each distinct entity and each distinct relationship are represented with respective, unique identifiers.

The entities represented by a knowledge graph need not be tangible things or specific people. The entities can include particular people, places, things, artistic works, concepts, events, or other types of entities. Thus, a knowledge graph can include data defining relationships between people (e.g., co-stars in a movie); data defining relationships between people and things (e.g., a particular singer recorded a particular song); data defining relationships between places and things (e.g., a particular type of wine comes from a particular geographic location); data defining relationships between people and places (e.g., a particular person was born in a particular city); and other kinds of relationships between entities.

In some implementations, each node has a type based on the kind of entity the node represents; and the types can each have a schema specifying the kinds of data that can be maintained about entities represented by nodes of the type and how the data should be stored. For example, a node of a type for representing a person could have a schema defining fields for information such as birth date, birthplace, and so on. Such information can be represented by fields in a type-specific data structure, or by triples that look like node-relationship-node triples (e.g., [person identifier, was born on, date]), or in any other convenient predefined way. In some examples, some or all of the information specified by a type schema can be represented by links to nodes in the knowledge graph, for example, [one person identifier, child of, another person identifier], where the other person identifier is a node in the graph.

Figure 2:
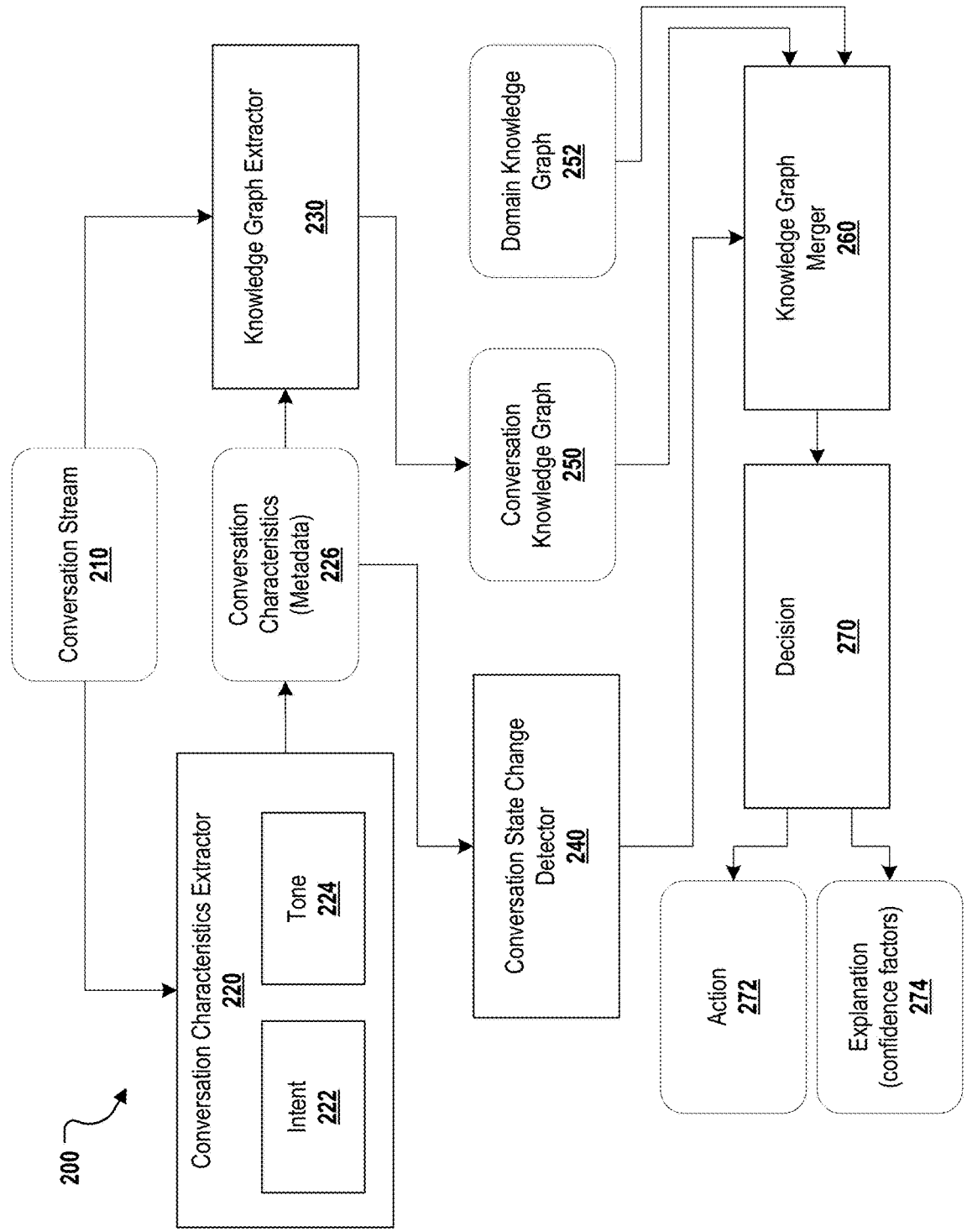
FIG. 2 depicts an example conversation monitoring system.

FIG. 2 depicts an example conversation monitoring system 200. The example system 200 includes conversation characteristics extractor module 220, knowledge-graph extractor module 230, conversation state change detector module 240, knowledge-graph merger module 260, and decision module 270. In the depicted example, the example conversation monitoring system 200 may be deployed to any special purpose computer system. The example system may be provided using one or more computing device(s) of any suitable number and type of computing device, such as depicted in FIG. 1. Configuration of such computing devices include shared, virtual, managed/dedicated, cluster/grid, cloud-based resources, and/or any combination thereof.

The example conversation monitoring system 200 can be deployed on a platform where users are conversing with robotic agents to monitor such conversations. In the depicted example, the conversation streams 210 from these monitored conversations are inputs the conversation characteristic extractor module 220 and the knowledge-graph extractor module 230. For example, when a user is chatting verbally with a chatbot, the speech can be converted to text through NLP. In another example, a user may be communicating with a chatbot by typing text into a text window. This text information is continuously fed to the conversation characteristic extractor module 220 and the knowledge-graph extractor module 230 where it is employed to extract a knowledge graph 250 of the respective monitored conversation.

The conversation characteristic extractor module 220 parses a conversation stream 210, and feeds the data to various internal modules, such as intent module 222 and tone module 224. These internal modules identify various conversation characteristics (e.g., metadata) 226 of the conversation. For example, conversation characteristics 226 may include the entities engaged in the conversation (e.g., the specific user and chatbot), the tone of the conversation, the intent of the user, and timestamp information regarding extracted statements and/or detected state changes in the conversation.

As the conversation stream data 210 is fed to knowledge-graph extractor module 230, the module parses the stream data 210 to identify concepts, such as topics, discussed and the relationship between them. The knowledge-graph extractor module 230 uses this information along with the conversation characteristics 226 extracted by the conversation characteristics extractor module 220 to extract a knowledge graph 250 of the respective monitored conversation. The knowledge graph 250 is updated as the conversation continues and additional conversation stream data 210 is fed to the knowledge-graph extractor module 230 and the conversation characteristics 226 are received from the conversation characteristics extractor module 220.

As the knowledge graph 250 is continuously updated by the knowledge-graph extractor module 230 from the conversation stream 210, the conversation state change detector module 240 parses the conversation characteristics to identify state changes and/or abnormal patterns in the conversation. In some implementations, the conversation state change detector module 240 may parse the conversation stream 210 directly. Identified state changes and/or abnormal patterns may include, but are not limited to, a change in the tone of the users or a change in the topic of conversation. In some implementations, the conversation state change detector module 240 checks for both positive and negative changes in order to trigger a decision (e.g., that the correct chatbot is being provide to the user). For example, a user's tone may go from polite to frustrated. The conversation state change detector module 240 may also track the trajectory of such changes in tone. When a state change in the conversation is detected, the conversation state change detector module 240 triggers a decision regarding the detected pattern based on the extracted knowledge graph 250.

Once the conversation state change detector module 240 has detected a state change or abnormal pattern, the knowledge-graph merger module 260 receives the conversation knowledge graph 250 extracted by the knowledge-graph extractor module 230. At this point, the conversation knowledge graph 250 may include, for example, the topics discussed during the conversation and the various tones of the conversations. In some implementations, the knowledge-graph merger module 260 may remove some of the edge of the conversation knowledge graph 250. For example, the knowledge-graph merger module 260 may determine that some nodes in the conversation knowledge graph 250 are irrelevant or less important to the current issue (e.g., the detected state change) based on, for example, a selection criteria and a threshold value. The selection criteria may be time based such that nodes are removed from the extracted conversation knowledge graph 250 based on their temporal proximity to the detected state change. In other examples, the selection criteria may be based on how much the node information is related to the detected state change and/or the current topic of conversation between the user and the chatbot.

In some implementations, the selection criteria that is used is based on the type of state change or abnormal conversation pattern that is detected by the conversation state change detector module 240. For example, when a change in tone is detected, the selection criteria that is employed may be based on the timestamp of each particular node to filter out the nodes that may not be the most relevant to the change in tone. In another example, when a change in the topic of conversation is detected, the selection criteria may be selected based on a node's relevance to the current topic of the conversation.

Once these irrelevant nodes have been removed, the now filtered/trimmed conversation knowledge graph 250 is merged with the domain knowledge graph 252. The domain knowledge graph may include, for example, information regarding the particular robotic agent servicing the platform. This information may include the expertise of each chatbot, the programmed "personality" of each chatbot, keywords associated with each chatbot, and so forth. The domain knowledge graph may also include a similar type of information regarding human agents as well as contextual information regarding the type of situations that are better suited for human agent interactions versus continued interaction with the robotic agent servicing the platform. For example, human agents may be able to adapt more easily to conversations and user dynamics in particular situations.

In some implementations, the knowledge-graph merger module 260 employs knowledge-graph embedding to merge the filtered conversation knowledge graph 250 with the domain knowledge graph 252. In some implementations, knowledge-graph embedding involves embedding the components (e.g., the nodes and the edges between them) of a knowledge graph into continuous vector spaces, to simplify the manipulation while preserving the inherent structure of the knowledge graph. Such knowledge-graph embedding places the nodes in a dimensional metric space to determine a position for each of the nodes. Once this position is determined, links between the nodes can be predicted. This information can then be used by the knowledge-graph merger module 260 to identify and quantify matches (e.g., a value representing the percentage matching) between various nodes of the filter conversation knowledge graph 250 and the nodes corresponding to, for example, each chatbot (and human agent) characterized in the domain knowledge graph 252. This matching is described in more detail in the description of FIG. 4D.

Once the filtered conversation knowledge graph 250 and the domain knowledge graph 252 have been merged through, for example, knowledge-graph embedding, the merged graphs are received by the decision module 270, which uses this information to predict or select a chatbot (or human agent) to intervene in a conversation (e.g., the action 272). For example, the percentage matching between various nodes in the merged graphs can be used to determine that the current chatbot is not a good match and to determine the action 272. The action 272 may include, for example, another chatbot to recommend or to intervene in the conversation. In some implementations, the percentages matching between the various nodes of the recommended chatbot and the filtered conversation knowledge graph 250 are used to assess confidence factors 274 in the selection of the new chatbot. The confidence factors 274 may be included in the recommendation or action regarding the new chatbot (or the recommendation to stay with the current chatbot). In some implementations, the confidence factors 274 represent how closely the recommended chatbot matches the relevant nodes from the filtered conversation knowledge graph 250.

As an example, a user may be conversing with a chatbot about taking a holiday. The system may determine that the current chatbot has a limited amount of and/or general knowledge regarding holidays and/or the particular destinations that are being discussed. The example conversation monitoring system 200 can be employed to determine (based on state change or conversation pattern) that the conversation is beginning to focus on an area about which the current chatbot has a limited scope of knowledge. Based on an extracted knowledge graph for the conversation, a chatbot that has a deeper and/or more sophisticated knowledge with respect to the area of the conversation (e.g., the particular topic) can be recommended or allocated to the conversation (e.g., the action 272).

Figure 3:
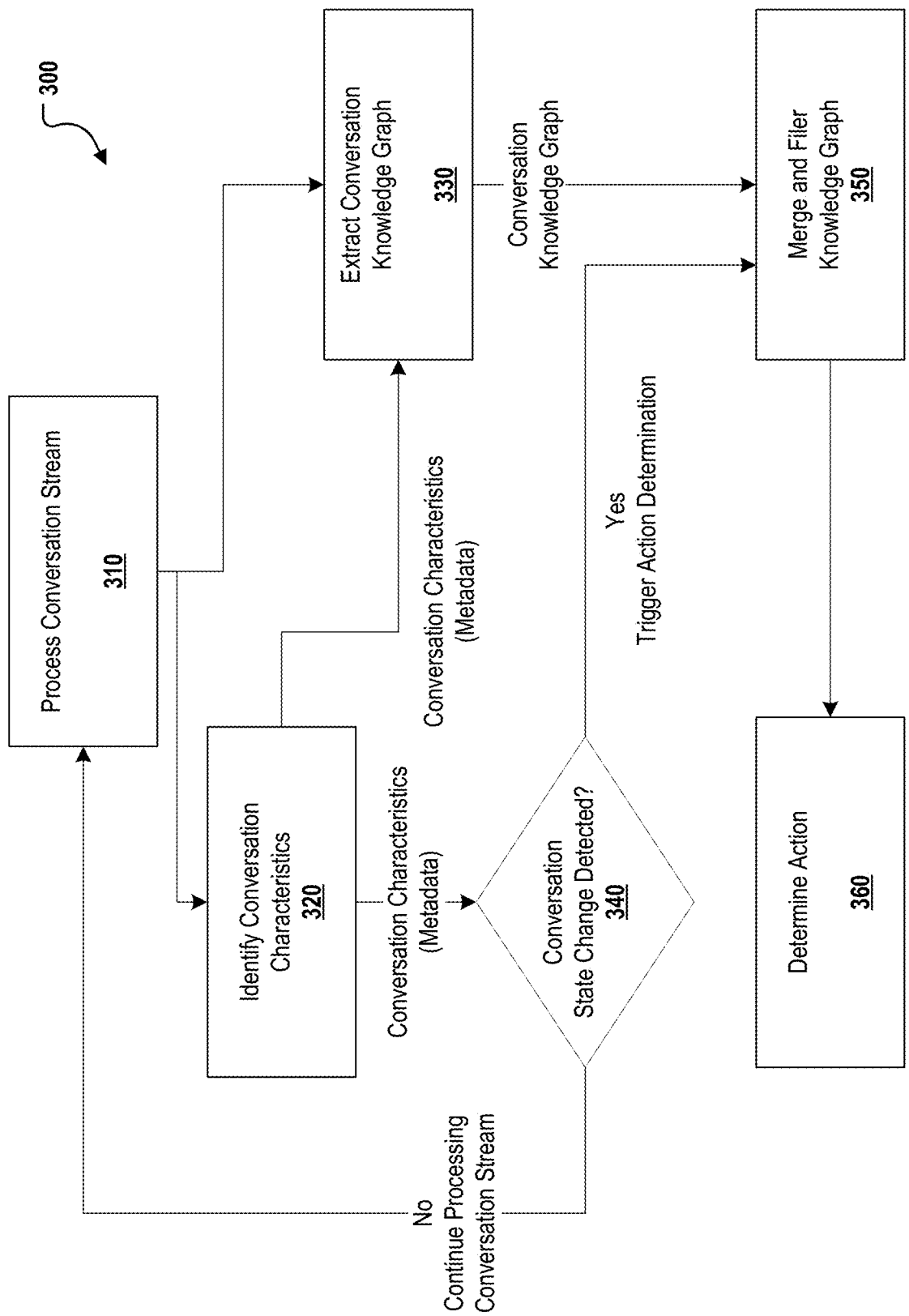
FIG. 3 depicts an example process that can be executed in implementations of the present disclosure.

FIG. 3 depicts an example process 300 that can be executed in implementations of the present disclosure. In some examples, the example process 300 is provided using one or more computer-executable programs executed by one or more computing devices (e.g., the back-end system 108 of FIG. 1). The example process 300 can be executed by a conversation monitoring system to provide an action regarding a chatbot allocated to a conversation with a user, as described herein.

A conversation stream from a conversation between a chatbot and a user is processed (402). For example, text typed into a text window by the user or text converted from speech through NLP may be communicated through the conversation stream. Conversation characteristics are identified (320). For example, the conversation characteristics extractor module 220 of FIG. 2 receives the conversation stream as input and determines the conversation characteristics as described previously with regards to FIG. 2. A knowledge graph is extracted (330) from the conversation steam and enriched by the conversation characteristics. For example, the knowledge-graph extractor module 230 of FIG. 2 extracts a knowledge graph base on a conversation stream and the extracted conversation characteristics provided by the conversation characteristics extractor module 220. The conversation stream is continually processed (310) until a state change in the conversation, such as a change in the user's tone or the topic of conversation, is detected (340). For example, the conversation state change detector module 240 of FIG. 2 analyzes the conversation characteristics or the conversation stream to detect a state change in the conversation.

When a state change in the conversation is detected, the extracted knowledge graph is filtered and merged (350) with a domain knowledge graph. For example, the knowledge-graph merger module 260 of FIG. 2 may merge the extracted conversation knowledge graph with a domain knowledge graph for the chatbot employed by the platform through knowledge-graph embedding. The merged graphs are then used to determine (360) an action regarding the conversation. For example, the decision module may determine to replace a chatbot in a conversation based on the merged graphs and the percentage matching between the various nodes of the recommended chatbot and the conversation knowledge graph.

Figure 4A:
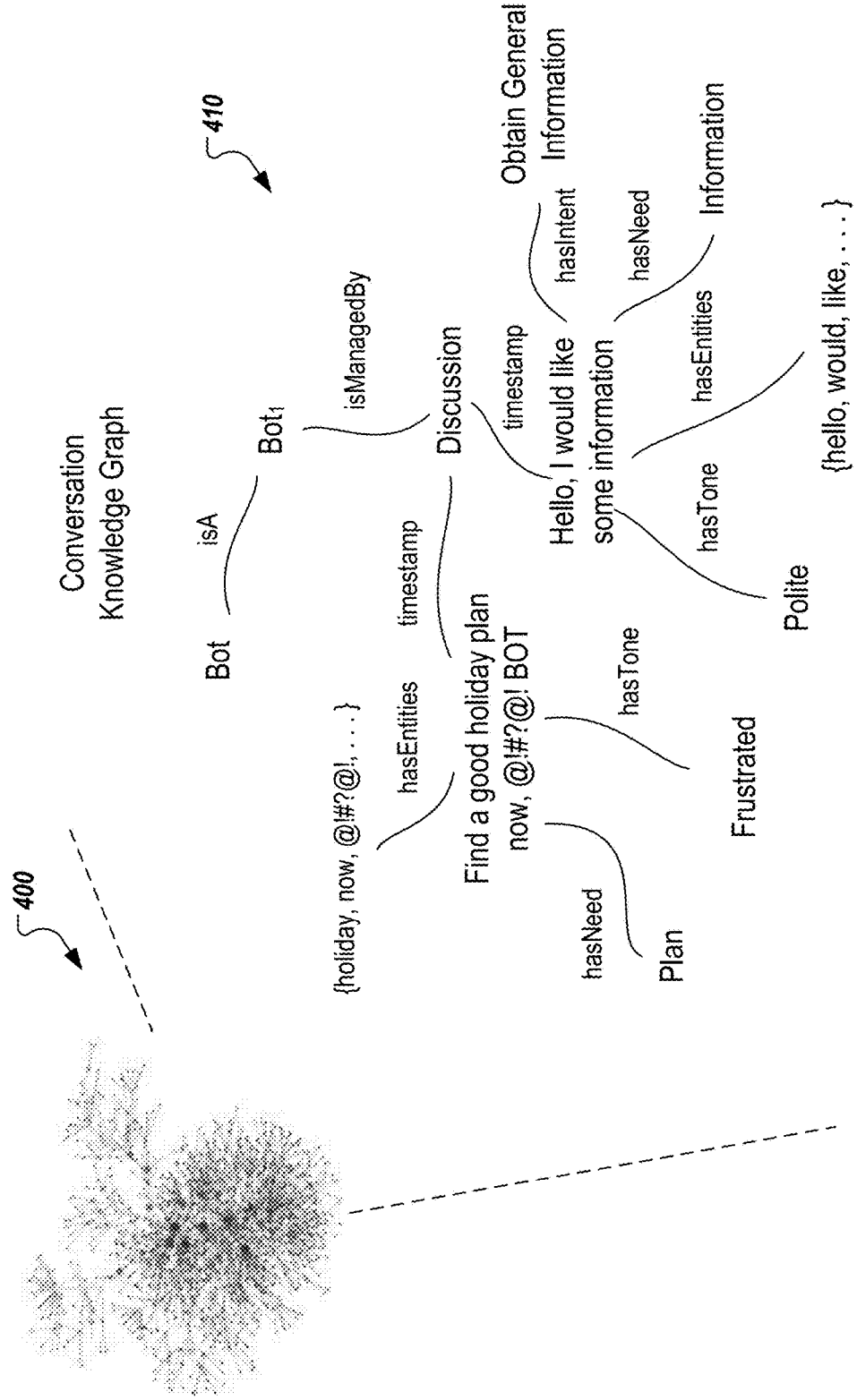
FIGS. 4A-4D depict example knowledge graphs in various stages as they are filtered and merged by a knowledge-graph merger module.

FIGS. 4A-4D depict example knowledge graphs in various stages as they are filtered and merged by the knowledge-graph merger module 260 from FIG. 2. Depicted in FIG. 4A, is a portion 410 of a knowledge graph 400, which represents a conversation between a user and a chatbot. For example, the knowledge graph 400 is extracted from the conversation by the knowledge-graph extractor module 230 of FIG. 2. In the example depicted in FIG. 4A, concepts corresponding to the example context are provided as nodes, and relationships between concepts are provided as edges. Example concepts include components (e.g., the chatbot engaged in the conversation) and concepts (e.g., extracted topics and tone) extracted from a conversation.

The example portion 410 represents respective temporal relationships between concepts. For example, the example portion 410 corresponds to a first time or first time range. In the depicted example, chatbot $Bot_1$ is engaged in the described conversation with the user. At a particular timestamp, a first phrase ("Hello, I would like some information") is identified. Various concepts that were extracted and/or identified regarding the first phrase are depicted in the knowledge graph portion 410 as nodes (e.g., polite, keywords, and so forth). The relationships between the concepts are depicted as edges in the knowledge graph portion 410 (e.g., hasIntent, hasNeed, hasTone, and so forth).

Figure 4B:
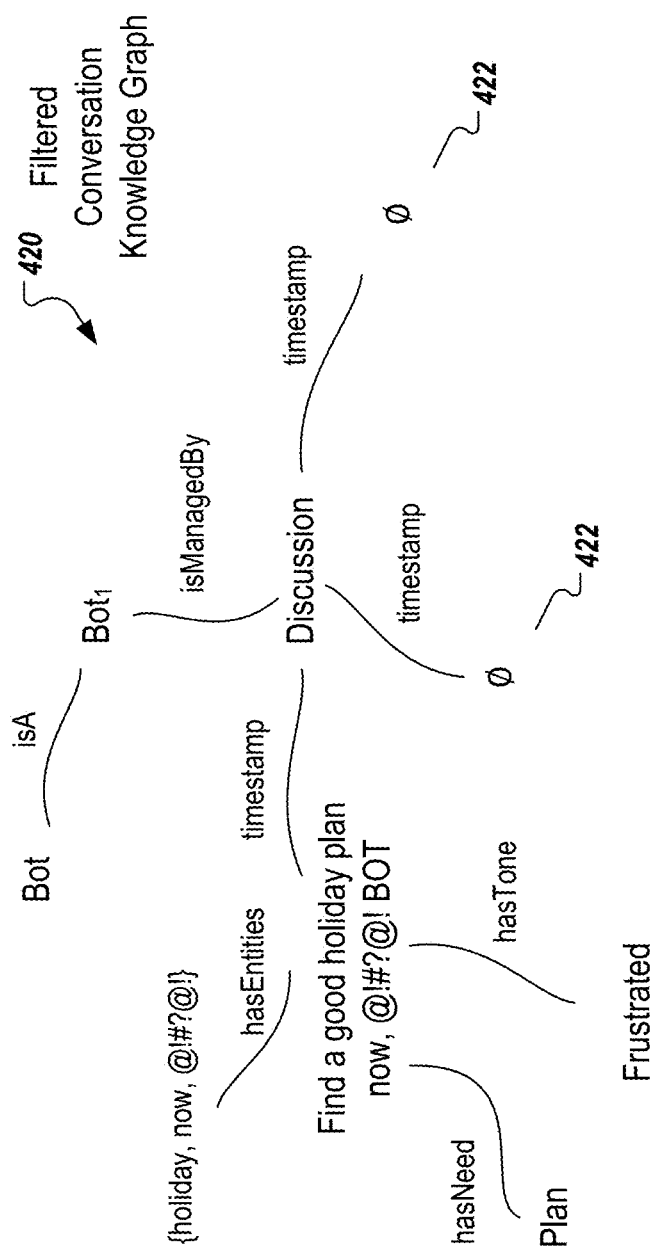

In accordance with implementations of the present disclosure, FIG. 4B depicts the portion of the knowledge graph 420 after irrelevant data has been filtered. The filtered content is depicted as null nodes 422. For example, when a state change in the conversation has been detected by the conversation state change detector module 240 of FIG. 2, the knowledge-graph merger module 260 may filter the current conversation knowledge graph corresponding to the monitored conversation to remove nodes that are irrelevant to the identified state change.

Figure 4C:
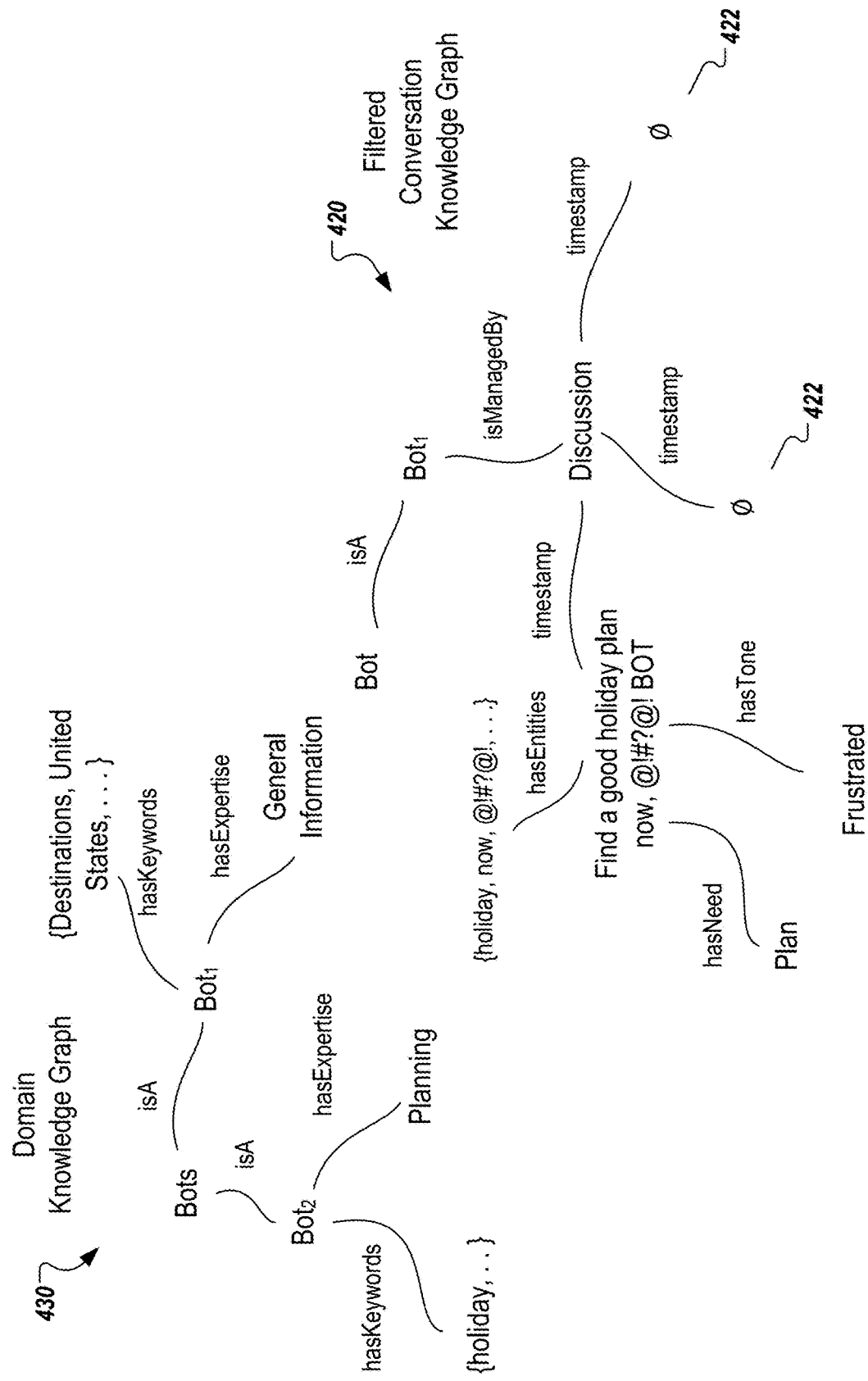

FIG. 4C depicts a portion of a domain knowledge graph 430, which includes information regarding features of the robotic or human agents that are in-service or available for the particular platform employing the conversation monitoring system. As depicted, the domain knowledge graph 430 includes information regarding the keywords and expertise associated with each chatbot. The domain knowledge graph 430 is provided as an example as a more detailed knowledge graph may be employed within the conversation monitoring system to provide for a robust determination of action and respective confidence factors.

Figure 4D:
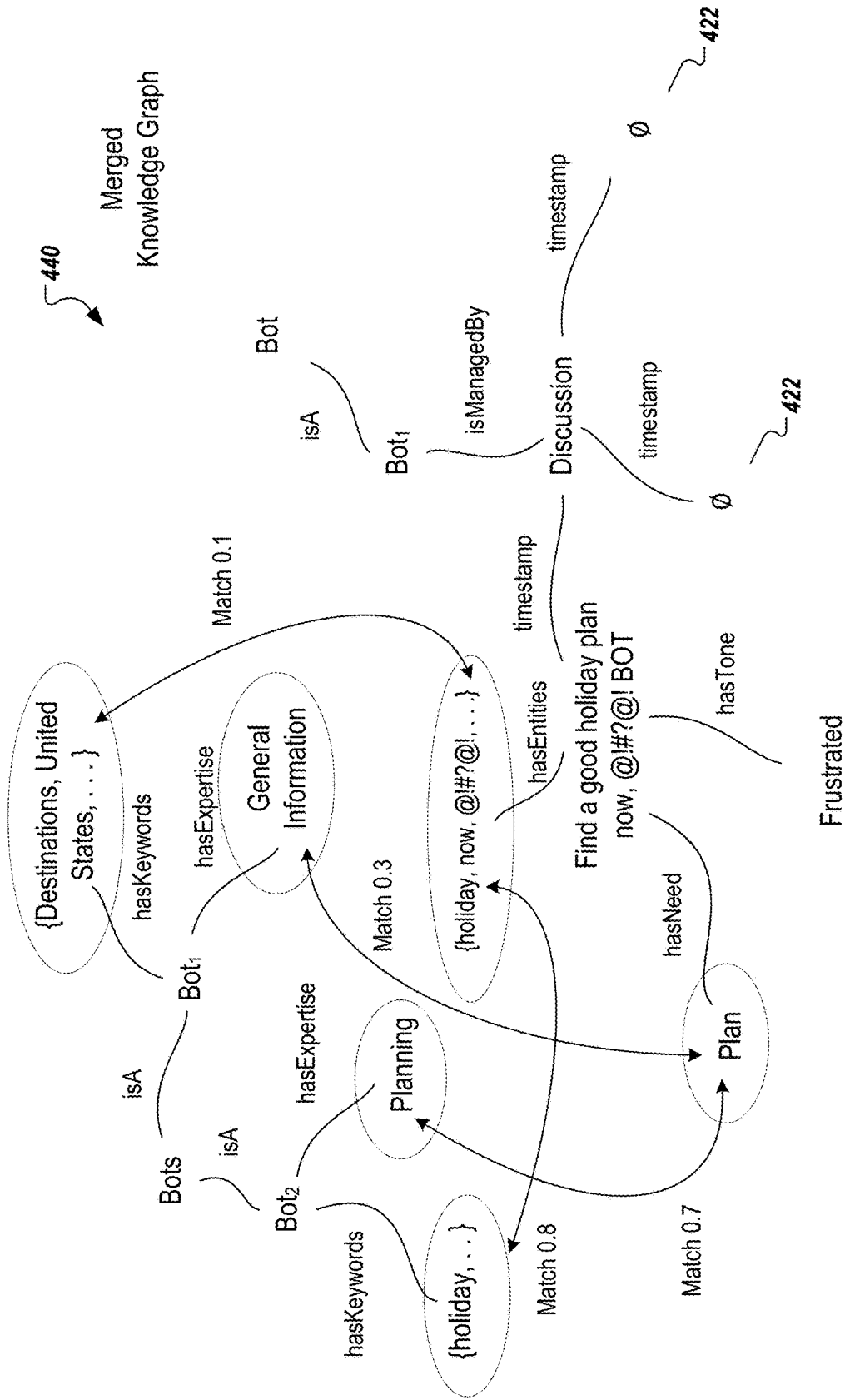

FIG. 4D depicts an example of a merged knowledge graph 440. The example depicts the percentage matching between various nodes in the merged graph 440. For example, the percentage of matching between the entries for the conversation phrase and the keywords corresponding to $Bot_1$ is 10 percent, while the percentage matching to the keywords for $Bot_2$ is 80 percent. Likewise, a percentage matching between the expertise for each bot and the user's need is also depicted (30 percent for $Bot_1$ and 70 percent for $Bot_2$). The merged knowledge graph 440 can be used by the decision module 270 of FIG. 2 to determine the action to take along with the confidence factors for the determined action, as described in detail with reference to FIG. 2.

Figure 5:
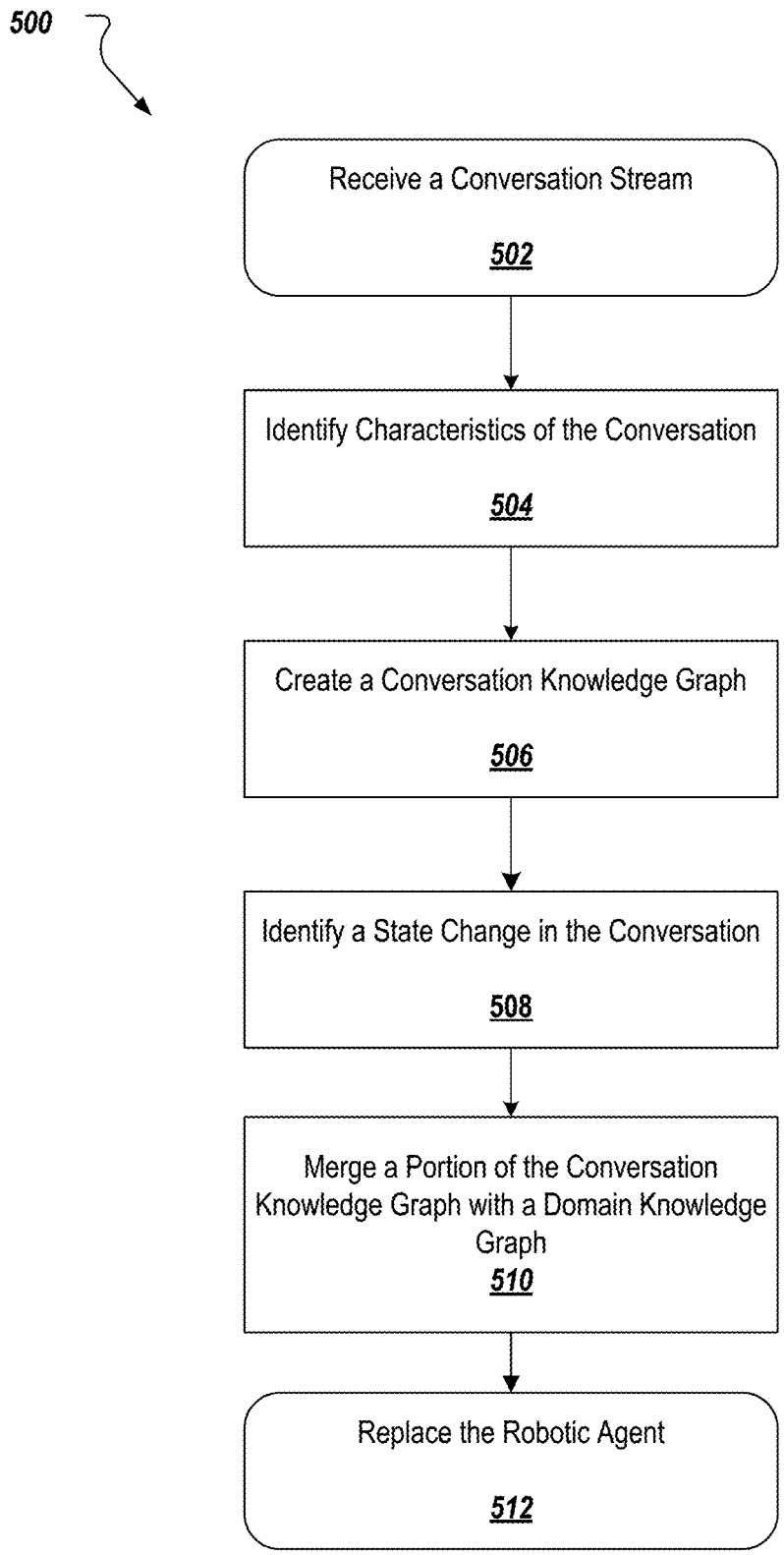
FIG. 5 depicts a flow diagram of an example process employed within a conversation monitoring system to provide an action regarding a robotic agent allocated to a conversation with a user.

FIG. 5 depicts a flow diagram of an example process 500 employed within a conversation monitoring system to provide an action regarding a robotic agent (e.g., a chatbot) allocated to a conversation with a user. A conversation stream is received (502). The conversation stream being generated from a conversation between a user of a platform and a current robotic agent that is one of a plurality of robotic agents servicing the platform. The robotic agents each includes a plurality of features. The conversation stream is processed (504) to identify characteristics of the conversation. A conversation knowledge graph is created (506) based on the characteristics of the conversation. The conversation knowledge graph includes a plurality of first nodes that each correspond a concept discussed in the conversation. A state change is identified (508) in the conversation from the identified characteristics of the conversation. A portion of the conversation knowledge graph is selected and merged (510) with a domain knowledge graph into a merged knowledge graph based on the identification of the state change in the conversation. The domain knowledge graph includes a plurality of second nodes that each correspond to at least one of the features for each of the robotic agents. The merged knowledge graph includes a percentage matching value between a portion of the first nodes and a portion of the second nodes. The current robotic agent is replaced (512) with a replacement robotic agent that is selected from the robotic agents based on the percentage matching value of the merged knowledge graph and the process ends.

Figure 6:
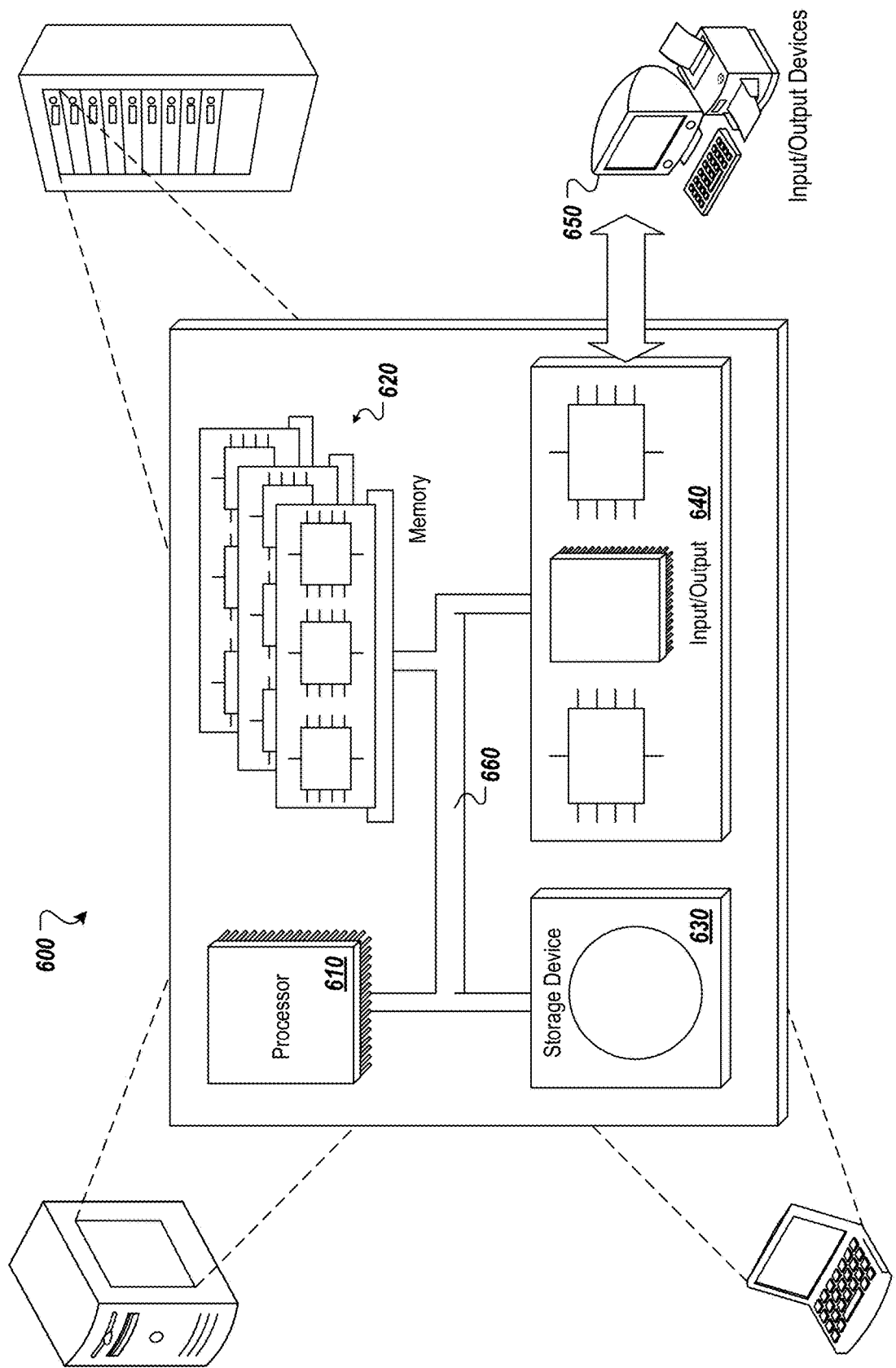
FIG. 6 depicts an example of a computing device and a mobile computing device.

FIG. 6 depicts an example computing system, according to implementations of the present disclosure. The system 600 may be used for any of the operations described with respect to the various implementations discussed herein. For example, the system 600 may be included, at least in part, in one or more of the computing device(s) or system(s) described herein. The system 600 may include one or more processors 610, a memory 620, one or more storage devices 630, and one or more input/output (I/O) devices 650 controllable via one or more I/O interfaces 640. The various components 610, 620, 630, 640, or 650 may be interconnected via at least one system bus 660, which may enable the transfer of data between the various modules and components of the system 600.

The processor(s) 610 may be configured to process instructions for execution within the system 600. The processor(s) 610 may include single-threaded processor(s), multi-threaded processor(s), or both. The processor(s) 610 may be configured to process instructions stored in the memory 620 or on the storage device(s) 630. For example, the processor(s) 610 may execute instructions for the various software module(s) described herein. The processor(s) 610 may include hardware-based processor(s) each including one or more cores. The processor(s) 610 may include general-purpose processor(s), special purpose processor(s), or both.

The memory 620 may store information within the system 600. In some implementations, the memory 620 includes one or more computer-readable media. The memory 620 may include any number of volatile memory units, any number of non-volatile memory units, or both volatile and non-volatile memory units. The memory 620 may include read-only memory, random access memory, or both. In some examples, the memory 620 may be employed as active or physical memory by one or more executing software modules.

The storage device(s) 630 may be configured to provide (e.g., persistent) mass storage for the system 600. In some implementations, the storage device(s) 630 may include one or more computer-readable media. For example, the storage device(s) 630 may include a floppy disk device, a hard disk device, an optical disk device, or a tape device. The storage device(s) 630 may include read-only memory, random access memory, or both. The storage device(s) 630 may include one or more of an internal hard drive, an external hard drive, or a removable drive.

One or both of the memory 620 or the storage device(s) 630 may include one or more computer-readable storage media (CRSM). The CRSM may include one or more of an electronic storage medium, a magnetic storage medium, an optical storage medium, a magneto-optical storage medium, a quantum storage medium, a mechanical computer storage medium, and so forth. The CRSM may provide storage of computer-readable instructions describing data structures, processes, applications, programs, other modules, or other data for the operation of the system 600. In some implementations, the CRSM may include a data store that provides storage of computer-readable instructions or other information in a non-transitory format. The CRSM may be incorporated into the system 600 or may be external with respect to the system 600. The CRSM may include read-only memory, random access memory, or both. One or more CRSM suitable for tangibly embodying computer program instructions and data may include any type of non-volatile memory, including but not limited to: semiconductor memory devices, such as erasable programmable read-only memory (EPROM), electrically erasable programmable read-only memory (EEPROM), and flash memory devices; magnetic disks such as internal hard disks and removable disks; magneto-optical disks; and compact disc read-only memory (CD-ROM) and digital versatile disc, read-only memory (DVD-ROM) disks. In some examples, the processor(s) 610 and the memory 620 may be supplemented by, or incorporated into, one or more application-specific integrated circuits (ASICs).

The system 600 may include one or more I/O devices 650. The I/O device(s) 650 may include one or more input devices such as a keyboard, a mouse, a pen, a game controller, a touch input device, an audio input device (e.g., a microphone), a gestural input device, a haptic input device, an image or video capture device (e.g., a camera), or other devices. In some examples, the I/O device(s) 650 may also include one or more output devices, such as a display, light-emitting diodes (LEDs) display, an audio output device (e.g., a speaker), a printer, a haptic output device, and so forth. The I/O device(s) 650 may be physically incorporated in one or more computing devices of the system 600, or may be external with respect to one or more computing devices of the system 600.

The system 600 may include one or more I/O interfaces 640 to enable components or modules of the system 600 to control, interface with, or otherwise communicate with the I/O device(s) 650. The I/O interface(s) 640 may enable information to be transferred in or out of the system 600, or between components of the system 600, through serial communication, parallel communication, or other types of communication. For example, the I/O interface(s) 640 may comply with a version of the RS-232 standard for serial ports, or with a version of the Institute of Electrical and Electronics Engineers (IEEE) 1284 standard for parallel ports. As another example, the I/O interface(s) 640 may be configured to provide a connection over Universal Serial Bus (USB) or Ethernet. In some examples, the I/O interface(s) 640 may be configured to provide a serial connection that is compliant with a version of the IEEE 1394 standard.

The I/O interface(s) 640 may also include one or more network interfaces that enable communications between computing devices in the system 600, or between the system 600 and other network-connected computing systems. The network interface(s) may include one or more network interface controllers (NICs) or other types of transceiver devices configured to send and receive communications over one or more communication networks using any network protocol.

Computing devices of the system 600 may communicate with one another, or with other computing devices, using one or more communication networks. Such communication networks may include public networks such as the internet, private networks such as an institutional or personal intranet, or any combination of private and public networks. The communication networks may include any type of wired or wireless network, including but not limited to local area networks (LANs), wide area networks (WANs), wireless WANs (WWANs), wireless LANs (WLANs), mobile communications networks (e.g., third generation (3G), fourth generations (4G), and Edge), and so forth. In some implementations, the communications between computing devices may be encrypted or otherwise secured. For example, communications may employ one or more public or private cryptographic keys, ciphers, digital certificates, or other credentials supported by a security protocol, such as any version of the Secure Sockets Layer (SSL) or the Transport Layer Security (TLS) protocol.

The system 600 may include any number of computing devices of any type. The computing device(s) may include, but are not limited to: a personal computer, a smartphone, a tablet computer, a wearable computer, an implanted computer, a mobile gaming device, an electronic book reader, an automotive computer, a desktop computer, a laptop computer, a notebook computer, a game console, a home entertainment device, a network computer, a server computer, a mainframe computer, a distributed computing device (e.g., a cloud computing device), a microcomputer, a system on a chip (SoC), a system in a package (SiP), and so forth. Although examples herein may describe computing device(s) as physical device(s), implementations are not so limited. In some examples, a computing device may include one or more of a virtual computing environment, a hypervisor, an emulation, or a virtual machine executing on one or more physical computing devices. In some examples, two or more computing devices may include a cluster, cloud, farm, or other grouping of multiple devices that coordinate operations to provide load balancing, failover support, parallel processing capabilities, shared storage resources, shared networking capabilities, or other aspects.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or a combination of one or more of them). A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a standalone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, such as, a field programmable gate array (FPGA), an ASIC, or a graphics processing unit (GPU).

Processors suitable for the execution of a computer program include, by way of example, both general and special purpose microprocessors, and any one or more processors of any appropriate kind of digital computer. Generally, a processor may receive instructions and data from a read only memory or a random access memory or both. Elements of a computer can include a processor for performing instructions and one or more memory devices for storing instructions and data. Generally, a computer may also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory may be supplemented by, or incorporated in, special purpose logic circuitry.

To provide for interaction with a user, implementations may be realized on a computer having a display device, e.g., a cathode ray tube (CRT) or liquid crystal display (LCD) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any appropriate form of sensory feedback, e.g., visual feedback, auditory feedback, or tactile feedback; and input from the user may be received in any appropriate form, including acoustic, speech, or tactile input.

Implementations may be realized in a computing system that includes a back end component, e.g., as a data server, or that includes a middleware component, e.g., an application server, or that includes a front end component, e.g., a client computer having a graphical user interface or a web browser through which a user may interact with an implementation, or any appropriate combination of one or more such back end, middleware, or front end components. The components of the system may be interconnected by any appropriate form or medium of digital data communication, e.g., a communication network. Examples of communication networks include a local area network (LAN) and a wide area network (WAN), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some examples be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method for replacing a robotic agent that is engaged in a conversation with a platform user, the method being executed by one or more processors and comprising:

during a conversation between a user of a platform and a current robotic agent:
receiving a conversation stream generated from the conversation between the user of the platform and the current robotic agent, wherein the current robotic agent is one of a plurality of robotic agents servicing the platform, and wherein each of the robotic agents includes a plurality of features,
processing the conversation stream to identify characteristics of the conversation;
creating, based on the characteristics of the conversation, a conversation knowledge graph that includes a plurality of first nodes that each correspond to a concept discussed in the conversation,
identifying a state change in the conversation from the identified characteristics of the conversation,
based on the identification of the state change in the conversation, selecting a portion of the conversation knowledge graph by filtering one or more nodes of the plurality of first nodes from the conversation knowledge graph to provide a trimmed conversation knowledge graph, and
merging the trimmed conversation knowledge graph with a domain knowledge graph to provide a merged knowledge graph, the domain knowledge graph being distinct from the conversation knowledge graph and comprising a plurality of second nodes that represent features of a first robotic agent of the plurality of robotic agents and a plurality of third nodes that represent features of a second robotic agent of the plurality of robotic agents, and wherein the merged knowledge graph includes a first percentage matching value between the first nodes and the second nodes and a second percentage matching value between the first nodes and the third nodes; and replacing the current robotic agent with a replacement robotic agent from the robotic agents to facilitate a conversation between the user and the replacement robotic agent, the replacement robotic agent selected as one of the first robotic agent and the second robotic agent based on the first percentage matching value and the second percentage matching value of the merged knowledge graph.

2. The method of claim 1, wherein the characteristics of the conversation comprise a semantic sentiment of the conversation, a topic of the conversation, a tone of the conversation, a temporal dimension of the conversation, or a combination thereof.

3. The method of claim 1, further comprising:
generating a confidence factor based on the percentage matching values, the confidence factor representing how closely the replacement robotic agent matches concepts discussed in the conversation.

4. The method of claim 1, wherein the one or more nodes filtered from the conversation knowledge graph are determined to be irrelevant based on the state change.

5. The method of claim 4, wherein the irrelevant first nodes are determined based on a temporal distance from the identified state change in the conversation.

6. The method of claim 4, wherein the irrelevant first nodes are determined based on a relevance to the identified state change in the conversation.

7. The method of claim 1, wherein the conversation knowledge graph includes a plurality of edges each connecting two of the first nodes, wherein each of the edges represent a relationship between the respective connected first nodes.

8. The method of claim 1, wherein the identified state change in the conversation comprises a change in a tone of the conversation with the user.

9. The method of claim 1, wherein the identified state change in the conversation comprises a change in a topic of conversation.

10. The method of claim 1, wherein the conversation stream is generated from speech converted to text through natural language processing (NLP).

11. The method of claim 1, wherein the robotic agents comprise chatbots.

12. The method of claim 1, wherein the current robotic agent is replaced with a human agent instead of the replacement robotic agent, wherein the human agent is selected based on the percentage matching value of the merged knowledge graph, and wherein the domain knowledge graph includes a portion of the second nodes that each correspond to features describing each of the human agents.

13. One or more non-transitory computer-readable storage media coupled to one or more processors and having instructions stored thereon which, when executed by the one or more processors, cause the one or more processors to perform operations comprising:
during a conversation between a user of a platform and a current robotic agent:
receiving a conversation stream generated from the conversation between the user of the platform and the current robotic agent, wherein the current robotic agent is one of a plurality of robotic agents servicing the platform and wherein each of the robotic agents includes a plurality of features,
processing the conversation stream to identify characteristics of the conversation;
creating, based on the characteristics of the conversation, a conversation knowledge graph that includes a plurality of first nodes that each correspond to a concept discussed in the conversation,
identifying a state change in the conversation from the identified characteristics of the conversation,
based on the identification of the state change in the conversation, selecting a portion of the conversation knowledge graph by filtering one or more nodes of the plurality of first nodes from the conversation knowledge graph to provide a trimmed conversation knowledge graph, and
merging the trimmed conversation knowledge graph with a domain knowledge graph to provide a merged knowledge graph, the domain knowledge graph being distinct from the conversation knowledge graph and comprising a plurality of second nodes that represent features of a first robotic agent of the plurality of robotic agents and a plurality of third nodes that represent features of a second robotic agent of the plurality of robotic agents, and wherein the merged knowledge graph includes a first percentage matching value between the first nodes and the second nodes and a second percentage matching value between the first nodes and the third nodes; and
replacing the current robotic agent with a replacement robotic agent from the robotic agents to facilitate a conversation between the user and the replacement robotic agent, the replacement robotic agent selected as one of the first robotic agent and the second robotic agent based on the first percentage matching value and the second percentage matching value of the merged knowledge graph.

14. The one or more non-transitory computer-readable media of claim 13, wherein the operations further comprise:
generating a confidence factor based on the percentage matching values, the confidence factor representing how closely the replacement robotic agent matches concepts discussed in the conversation.

15. The one or more non-transitory computer-readable media of claim 13, wherein the current robotic agent is replaced with a human agent instead of the replacement robotic agent, wherein the human agent is selected based on the percentage matching value of the merged knowledge graph, and wherein the domain knowledge graph includes a portion of the second nodes that each correspond to features describing each of the human agents.

16. The one or more non-transitory computer-readable media of claim 13, wherein the identified state change in the conversation comprises a change in a tone of the conversation with the user or a change in a topic of conversation.

17. A system, comprising:
one or more processors; and
a computer-readable storage device coupled to the one or more processors and having instructions stored thereon which, when executed by the one or more processors, cause the one or more processors to perform operations comprising:
during a conversation between a user of a platform and a current robotic agent:
receiving a conversation stream generated from the conversation between the user of the platform and the current robotic agent, wherein the current robotic agent is one of a plurality of robotic agents servicing the platform, and wherein each of the robotic agents includes a plurality of features,
processing the conversation stream to identify characteristics of the conversation, creating, based on the characteristics of the conversation, a conversation knowledge graph that includes a plurality of first nodes that each correspond to a concept discussed in the conversation, identifying a state change in the conversation from the identified characteristics of the conversation, based on the identification of the state change in the conversation, selecting a portion of the conversation knowledge graph by filtering one or more nodes of the plurality of first nodes from the conversation knowledge graph to provide a trimmed conversation knowledge graph, and merging the trimmed conversation knowledge graph with a domain knowledge graph to provide a merged knowledge graph, the domain knowledge graph being distinct from the conversation knowledge graph and comprising a plurality of second nodes that represent features of a first robotic agent of the plurality of robotic agents and a plurality of third nodes that represent features of a second robotic agent of the plurality of robotic agents, and wherein the merged knowledge graph includes a first percentage matching value between the first nodes and the second nodes and a second percentage matching value between the first nodes and the third nodes; and replacing the current robotic agent with a replacement robotic agent from the robotic agents to facilitate a conversation between the user and the replacement robotic agent, the replacement robotic agent selected as one of the first robotic agent and the second robotic agent based on the first percentage matching value and the second percentage matching value of the merged knowledge graph.

18. The system of claim 17, wherein the operations wherein the one or more nodes filtered from the conversation knowledge graph are determined to be irrelevant based on the state change.

19. The system of claim 18, wherein irrelevant nodes are determined based on a temporal distance from the identified state change in the conversation.

20. The system of claim 18, wherein irrelevant nodes are determined based on a relevance to the identified state change in the conversation.

* * * * *